Mar. 20, 1923.
J. C. SANDERS.
COLLAR CLIP.
FILED JAN. 12, 1922.
1,449,060.
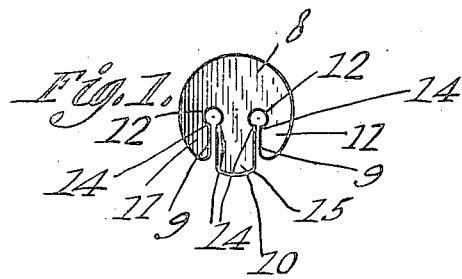
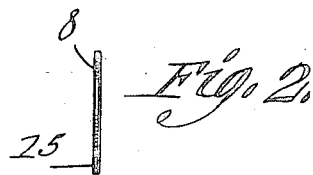
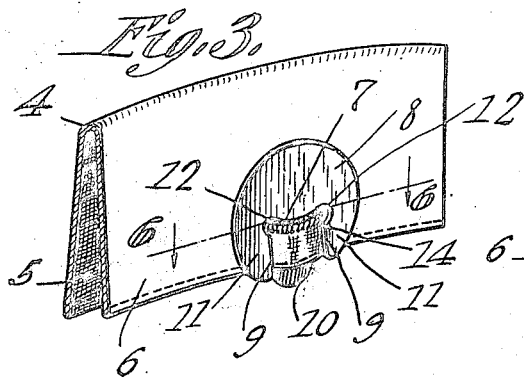
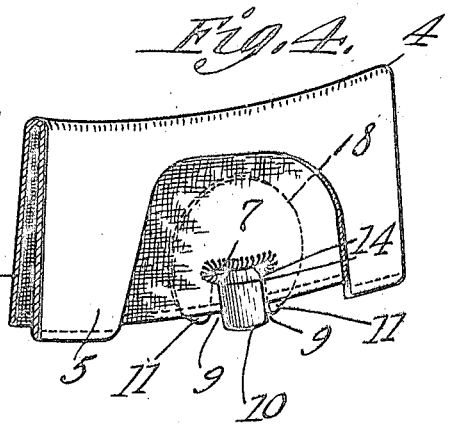
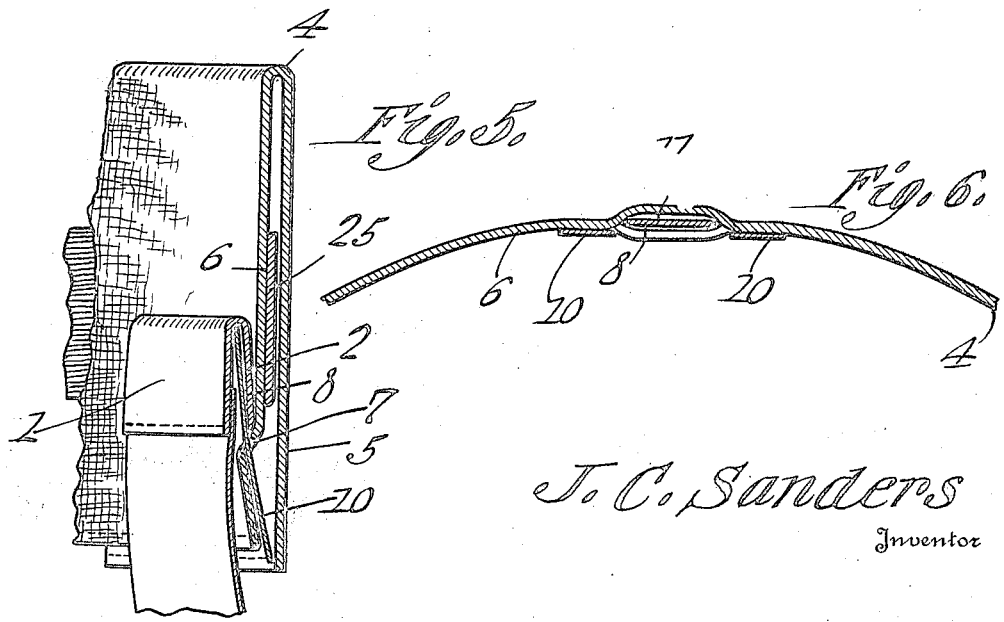
J. C. Sanders
Inventor
By Cashow & Co.
Attorney Patented Mar. 20, 1923.

1,449,060

UNITED STATES PATENT OFFICE.

JOHN C. SANDERS, OF HARRISBURG, PENNSYLVANIA.

COLLAR CLIP.

Application filed January 12, 1922. Serial No. 528,786.

*To all whom it may concern:*

Be it known that I, JOHN C. SANDERS, a citizen of the United States, residing at Harrisburg, in the county of Dauphin and State of Pennsylvania, have invented a new and useful Collar Clip, of which the following is a specification.

The device forming the subject matter of this application is adapted to be used for attaching a collar to the neck band of a shirt, and one object of the invention is to provide a simple one-piece fastener which is thin, reversible and inexpensive to manufacture.

Another object of the invention is so to construct the fastener that the same will have a strong and secure grip on the collar.

It is within the province of the disclosure to improve generally and to enhance the utility of devices of that type to which the invention appertains.

In the drawings:—

Figure 1 shows in plan, a device constructed in accordance with the invention; Figure 2 is an elevation wherein the device is shown edgewise; Figure 3 is an elevation showing a portion of a collar wherewith the device forming the subject matter of this application has been assembled, it being presupposed that the observer is looking at the inner wall of the collar; Figure 4 is a view showing a collar wherewith the device forming the subject matter of this application has been applied, it being assumed that the observer is looking at the outer wall of the collar, the outer wall of the collar being broken away; Figure 5 is a transverse section taken through the collar and the shirt band and Figure 6 is a section on the line 6—6 of Figure 3.

The structure forming the subject matter of this application comprises a disk 8 made of metal or other resilient material, the disk being provided in one edge with approximately parallel slits 9 forming an intermediate tongue 10 and side tongues 11. There are enlarged openings 12 in the disk 8 at the inner ends of the slits 9, the openings defining gripping points 14 in the tongues 10 and 11. Noting Figure 2 of the drawings, it will be observed that all portions of the disk 8 and the tongues 10 and 11 are located in a common plane. As indicated by the numeral 15, the intermediate tongue 10 preferably is slightly longer than the side tongues 11.

The structure may be used in various ways. One method of application will now be described. The numeral 1 denotes a shirt band having the usual outer strip 2. The numeral 4 marks a collar including an outer wall 5 and an inner wall 6. The disk 8 may be placed against the wall 6 of the collar, the intermediate tongue 10 being pushed downwardly and inwardly through the button hole 7 in the inner wall of the collar. The major portion of the disk 8 thus is disposed on the external surface of the inner wall 6 of the collar, as clearly shown in Figure 3, and may be hooked under the lower edge of the outer strip 2 of the shirt band 1, as shown in Figure 5, and in this way the collar may be assembled without difficulty with the shirt band.

Since all portions of the device are located in a common plane, as shown in Figure 2, it is possible to effect a reversal, either side of the disk being placed next to the surface of the inner wall of the collar. In view of the fact that the intermediate tongue 10 is slightly longer than the side tongues 11 as shown at 15, the tongue 10 may be inserted readily into the button hole 7. The gripping points 14 formed by the openings 12 enable the disk to retain a firm hold on the collar. Noting Figure 5, it will be seen that the tongue 10 spaces the walls 5 and 6 of the collar and facilitates the longitudinal sliding of a necktie 25 between the said walls. No attention need be given to the handling of the device when the same is mounted in the collar, it being necessary, merely, to thrust the tongue 10 through the button hole 7, regardless of which the face of the disk is toward the collar.

Having thus described the invention, what is claimed is:—

1. A device of the class described comprising a disk provided with approximately parallel slits forming a resilient intermediate tongue and resilient side tongues, there being enlarged openings in the disk at the inner ends of the slits, the openings defining gripping points in all of the tongues, all portions of the disk and of the tongues lying in a common plane, whereby the device may be reversed.

2. A device of the class described, constructed as set forth in claim 1 and further characterized by the fact that the intermediate tongue is longer than the side tongues.

In testimony that I claim the foregoing as my own, I have hereto affixed my signature in the presence of two witnesses.

JOHN C. SANDERS.

Witnesses:
P. F. PENDERGAST,
R. R. LOBAN.